(12) United States Patent
Alexander et al.

(10) Patent No.: US 9,749,298 B2
(45) Date of Patent: *Aug. 29, 2017

(54) RECOVERY FROM DECRYPTION ERRORS IN A SEQUENCE OF COMMUNICATION PACKETS

(71) Applicant: MARVELL WORLD TRADE LTD., St. Michael (BB)

(72) Inventors: Danny Alexander, Neve Efraim Monoson (IL); Amit Wix, Petah-Tikva (IL)

(73) Assignee: MARVELL WORLD TRADE LTD., St. Michael (BB)

( * ) Notice: Subject to any disclaimer, the term of this patent is extended or adjusted under 35 U.S.C. 154(b) by 91 days.

This patent is subject to a terminal disclaimer.

(21) Appl. No.: 14/596,312

(22) Filed: Jan. 14, 2015

(65) Prior Publication Data

US 2016/0182460 A1  Jun. 23, 2016

Related U.S. Application Data

(63) Continuation of application No. 14/055,922, filed on Oct. 17, 2013, now Pat. No. 8,964,985, which is a continuation of application No. 13/396,610, filed on Feb. 15, 2012, now Pat. No. 8,582,768.

(60) Provisional application No. 61/443,594, filed on Feb. 16, 2011, provisional application No. 61/558,408, filed on Nov. 10, 2011.

(51) Int. Cl.
*H04L 9/12* (2006.01)
*H04W 12/08* (2009.01)
*H04L 29/06* (2006.01)
*H04W 12/02* (2009.01)
*H04K 1/00* (2006.01)

(52) U.S. Cl.
CPC ........... *H04L 63/0428* (2013.01); *H04K 1/00* (2013.01); *H04L 9/12* (2013.01); *H04W 12/02* (2013.01); *H04W 12/08* (2013.01)

(58) Field of Classification Search
CPC ...................................................... H04L 9/12
See application file for complete search history.

(56) References Cited

U.S. PATENT DOCUMENTS 6,643,815 B1    11/2003  Davis et al.
7,028,335 B1 *   4/2006  Borella ............. H04L 29/12367
                                                  370/389

(Continued)

OTHER PUBLICATIONS

U.S. Appl. No. 14/333,547 Office Action dated Jan. 21, 2016.

(Continued)

*Primary Examiner* — Saleh Najjar
*Assistant Examiner* — Devin Almeida

(57) ABSTRACT

A method in a receiver includes receiving from a transmitter a sequence of communication packets, which carry data encrypted with an encryption scheme. The encryption scheme depends on a counter value that is incremented independently by each of the transmitter and the receiver. Attempts are made to decrypt the data of a received packet multiple times using different, respective counter values, to produce multiple respective decrypted outputs. A decrypted output in which the data has been decrypted correctly is identified, the counter value is corrected, and the data of the received packet is recovered from the identified decrypted output.

12 Claims, 3 Drawing Sheets

(56) References Cited

U.S. PATENT DOCUMENTS

| | | | |
|---|---|---|---|
| 2002/0157007 A1* | 10/2002 | Sashihara | H04L 63/083 713/183 |
| 2005/0226227 A1 | 10/2005 | Kim et al. | |
| 2006/0212770 A1 | 9/2006 | Fischer et al. | |
| 2008/0123655 A1* | 5/2008 | Kim | H04L 1/1867 370/394 |
| 2010/0332933 A1 | 12/2010 | Kubota | |
| 2012/0207302 A1 | 8/2012 | Alexander et al. | |

OTHER PUBLICATIONS

3GPP TS 25.323, "3rd Generation Partnership Project; Technical Specification Group Radio Access Network; Packet Data Convergence Protocol (PDCP) specification (Release 8)", version 8.5.0, 42 pages, Dec. 2009.

ETSI TS 125 321, "Universal Mobile Telecommunications System (UMTS);Medium Access Control (MAC) protocol specification", (3GPP TS 25.321, version 11.5.0, Release 11), 212 pages, Jan. 2014.

ETSI TS 126 101, "Digital cellular telecommunications system (Phase 2+);Universal Mobile Telecommunications System (UMTS);LTE;Mandatory speech codec speech processing functions;Adaptive Multi-Rate (AMR) speech codec frame structure", (3GPP TS 26.101, version 11.0.0 Release 11), 22 pages, Oct. 2012.

ETSI TS 126 201, "Digital cellular telecommunications system (Phase 2+);Universal Mobile Telecommunications System (UMTS);LTE;Speech codec speech processing functions;Adaptive Multi-Rate—Wideband (AMR-WB) speech codec;Frame structure", (3GPP TS 26.201, version 11.0.0, Release 11), 24 pages, Oct. 2012.

3GPP TS 33 102, "3rd Generation Partnership Project; Technical Specification Group Services and System Aspects; 3G Security; Security architecture (Release 11)", V11.5.1, 76 pages, Jun. 2013.

3GPP TS 25.211, "3rd Generation Partnership Project;Technical Specification Group Radio Access Network;Physical channels and mapping of transport channels onto physical channels (FDD)", version 11.0.0, Release 11, 60 pages, Dec. 2011.

3GPP TS 26.090, "3rd Generation Partnership Project;Technical Specification Group Services and System Aspects; Mandatory Speech Codec speech processing functions;Adaptive Multi-Rate (AMR) speech codec;Transcoding functions", version 11.0.0, Release 11, 55 pages, Sep. 2012.

Holma et al, WCDMA for UMTS—HSPA Evolution and LTE, Fourth Edition, Wiley, 58 pages, 2007.

* cited by examiner

RECOVERY FROM DECRYPTION ERRORS IN A SEQUENCE OF COMMUNICATION PACKETS

CROSS-REFERENCE TO RELATED APPLICATIONS

This application is a continuation of U.S. patent application Ser. No. 14/055,922, filed Oct. 17, 2013, which is a continuation of U.S. patent application Ser. No. 13/396,610, filed Feb. 15, 2012, which claims the benefit of U.S. Provisional Patent Application 61/443,594, filed Feb. 16, 2011, and U.S. Provisional Patent Application 61/558,408, filed Nov. 10, 2011. The disclosures of all these related applications are incorporated herein by reference.

FIELD OF THE DISCLOSURE

The present invention relates generally to communication systems, and particularly to methods and systems for decryption in communication systems.

BACKGROUND

Some communication systems support a mode in which voice calls are transported over data packets. The Universal Mobile Telecommunications System (UMTS) standards specified by the Third Generation Partnership Project (3GPP), for example, define a "Circuit-Switched (CS) voice over HSPA" mode in which voice calls are mapped onto High Speed Packet Access (HSPA).

Communication in this mode typically involves both the Radio Link Control (RLC) layer and the Packet Data Convergence Protocol (PDCP) layer of the communication connection. The RLC layer is defined, for example, in "Universal Mobile Telecommunications System (UMTS); Radio Link Control (RLC) Protocol Specification," 3GPP TS 25.322, version 8.9.0, release 8, June, 2010, which is incorporated herein by reference. The PDCP layer is defined, for example, in "Universal Mobile Telecommunications System (UMTS); Packet Data Convergence Protocol (PDCP) Specification," 3GPP TS 25.323, version 8.5.0, release 8, February, 2010, which is incorporated herein by reference.

The data transported in UMTS data packets may be encrypted in order to provide data security. Ciphering in UMTS is defined, for example, in "Universal Mobile Telecommunications System (UMTS); LTE; 3G security; Security Architecture," 3GPP TS 33.102, version 8.6.0, release 8, April, 2010, which is incorporated herein by reference.

The description above is presented as a general overview of related art in this field and should not be construed as an admission that any of the information it contains constitutes prior art against the present patent application.

SUMMARY

An embodiment that is described herein provides a method in a receiver. The method includes receiving from a transmitter a sequence of communication packets, which carry data encrypted with an encryption scheme. The encryption scheme depends on a counter value that is incremented independently by each of the transmitter and the receiver. Attempts are made to decrypt the data of a received packet multiple times using different, respective counter values, to produce multiple respective decrypted outputs. A decrypted output in which the data has been decrypted correctly is identified, and the data of the received packet is recovered from the identified decrypted output.

In some embodiments, the method includes correcting the counter value that is incremented by the receiver to match the counter value that is incremented by the transmitter, based on the counter value of the decrypted output in which the data has been decrypted correctly. In an embodiment, identifying the decrypted output in which the data has been decrypted correctly includes verifying a value of a header field in the received packet.

In a disclosed embodiment, attempting to decrypt the data and identifying the decrypted output include iteratively incrementing the counter value and re-attempting to decrypt the data using the incremented counter value, until producing the decrypted output in which the data is decrypted correctly. In another embodiment, identifying the decrypted output includes identifying the decrypted output after all the multiple decrypted outputs are produced. In yet another embodiment, the method includes recovering the counter value from the decrypted output in which the data has been decrypted correctly, and applying the recovered counter value in decryption of one or more subsequent packets in the sequence.

In some embodiments, receiving the packets includes receiving a Wideband Code Division Multiple Access (WCDMA) voice call mapped onto High Speed Packet Access (HSPA) packets, and the counter value includes a Radio Link Control Hyper-Frame Number (RLC HFN). In alternative embodiments, receiving the packets includes receiving Internet Protocol (IP) packets in accordance with a Long Term Evolution (LTE) specification, and the counter value includes a Packet Data Convergence Protocol Hyper-Frame Number (PDCP HFN). In some embodiments, decryption of the data using the different counter values is attempted only in response to a failure to decrypt the data using the counter value that is incremented by the receiver.

There is additionally provided, in accordance with an embodiment that is described herein, apparatus including a receiver front end and a decryption unit. The receiver front end is configured to receive from a transmitter a sequence of communication packets, which carry data encrypted with an encryption scheme that depends on a counter value that is incremented by the transmitter. The decryption unit is configured to attempt to decrypt the data of a received packet multiple times using different, respective counter values so as to produce multiple respective decrypted outputs, to identify a decrypted output in which the data has been decrypted correctly, and to recover the data of the received packet from the identified decrypted output.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

In some communication protocols, a sequence of communication packets carries data encrypted with an encryption scheme that depends on a counter value. As a security measure, the counter value is not transmitted over the air, but is rather incremented independently by the transmitter and the receiver. In order to decrypt a packet, the receiver must possess the correct counter value and provide it to the decryption circuitry. A mechanism of this sort is used, for example, when mapping voice calls over HSPA in UMTS networks, or when sending Internet Protocol (IP) packets in Long Term Evolution (LTE) networks.

In some cases, however, the receiver may miss an unknown number of packets in the sequence. In such a case, the receiver may lose track of the correct counter value and therefore fail to decrypt subsequent packets. Section 9.3 of the 3GPP TS 25.323 specification, cited above, specifies requirements for overcoming such failures in UMTS, but the specified mechanism is inefficient and liable to cause calls to be dropped.

Embodiments that are described herein provide improved methods and systems for processing encrypted packets in communication receivers. In the disclosed embodiments, the receiver's decryption circuitry attempts to decrypt the data of a received packet multiple times using different, respective counter values. From the resulting multiple decrypted outputs, each corresponding to a different counter value, the decryption circuitry identifies a decrypted output in which the data has been decrypted correctly. The data of the received packet is then recovered from the identified decrypted output.

Upon successfully decrypting the packet, the decryption circuitry typically replaces the receiver's counter value with the successful counter value, so as to match the counter value of the transmitter. From this point, the receiver continues to increment the counter value correctly, and is therefore able to decrypt subsequent packets in the sequence without risk of dropping a call.

In some embodiments, decryption using different counter values is attempted only upon detecting a mismatch in the counter value between the transmitter and the receiver. In other embodiments, the decryption circuitry carries out decryption using different counter values regardless of whether a mismatch is present or not.

Receivers that use the disclosed techniques are able to recover from packet loss scenarios and regain synchronization to the correct counter value with high speed and minimal loss of data. In an example configuration that is described herein, the receiver is able to decrypt the first packet that is received after reception is resumed. Given sufficient processing power, the decryption circuitry can be designed using the disclosed techniques to overcome any specified number of missed packets.

Figure 1:
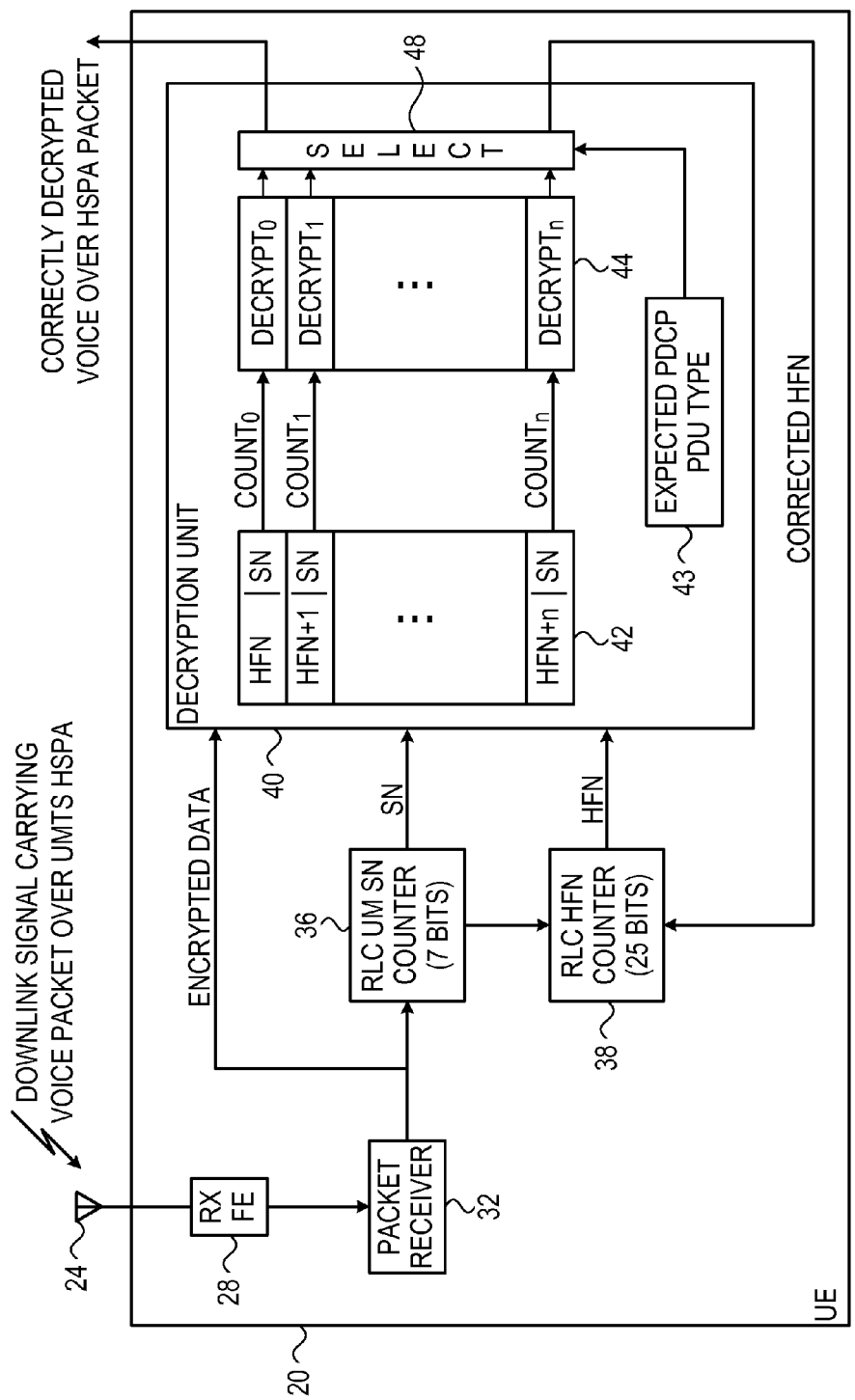
FIG. 1 is a block diagram that schematically illustrates a mobile communication terminal, in accordance with an embodiment that is described herein.

FIG. 1 is a block diagram that schematically illustrates a mobile communication terminal 20, in accordance with an embodiment that is described herein. In various embodiments, terminal 20 comprises, for example, a cellular phone, a wireless-enabled mobile computing device, or any other suitable type of wireless communication terminal.

In the present example, terminal 20 comprises a User Equipment (UE) in a 3GPP UMTS network. In alternative embodiments, terminal 20 may operate in any other suitable communication network and in accordance with any other suitable communication standard or protocol. For example, FIG. 3 further below illustrates an alternative embodiment in which terminal 20 comprises a UE in an LTE network. The disclosed techniques are applicable to any encryption scheme that uses the RLC layer Unacknowledged Mode (UM). Although the embodiments described herein refer mainly to downlink reception, i.e., to receivers in mobile communication terminals, the disclosed techniques are also applicable to uplink reception, i.e., to receivers in base stations.

In the present embodiment, UE 20 receives a Radio Frequency (RF) downlink signal from a base station (e.g., UMTS NodeB—not shown in the figure). The downlink signal received by UE 20 carries a sequence of data packets, which conveys a voice call in accordance with the CS voice over HSPA mode. The data and at least some of the header fields of each packet are encrypted in order to provide data security. In some embodiments, each packet (also referred to as Packet Data Unit-PDU) comprises a Radio Link Control (RLC) sequence number that increments from one packet to the next. In an embodiment, the RLC sequence number has seven bits, and it is incremented cyclically, i.e., has a period of 128 packets. The sequence number size is presented here by way of example, and any other suitable size can be used. The alternative embodiment of FIG. 3 below, for example, uses a different-size RLC sequence number.

UE 20 and the base station increment a counter value that is referred to as RLC Hyper Frame Number (HFN), or HFN for brevity. The HFN value is incremented once every period of the RLC sequence number, when the RLC sequence number wraps around to zero, i.e., once every 128 packets. In the present example, the HFN has 25 bits and is also incremented cyclically.

The current value of the HFN is used by the base station and the UE as part of a key for encrypting and decrypting the packets. Typically, the base station encrypts each transmitted packet using the current HFN value (in combination with other parameters), and the UE uses the current HFN value for decrypting each received packet.

As a security measure, the HFN value is not transmitted in the packets in any way. Instead, the base station and the UE each increment the HFN value independently by counting transmitted or received packets. This mechanism helps to prevent illegitimate decryption of packets by a receiver that is not synchronized with the base station (and is therefore unaware of the current HFN value).

In some cases, however, UE 20 may miss an unknown number of packets in the sequence. Packet loss may be caused, for example, by a temporary attenuation of the communication channel due to movement of the UE or for any other reason. An event of this sort may cause a mismatch between the HFN value that is incremented by the base station and the HFN value that is incremented by UE 20.

When packet reception is resumed (and unless the mismatch is corrected) the UE may attempt to decrypt subsequent packets using incorrect HFN values (HFN values that are different from those used by the base station for decrypting the respective packets). As a result, the decryption is likely to fail and the connection or call may be dropped. In some embodiments, UE 20 recovers from possible decryption errors of this sort using techniques that are described in detail below.

In the embodiment of FIG. 1, UE 20 comprises an antenna 24 for receiving the downlink RF signal that carries the sequence of packets transmitted by the base station. A receiver front end (RX FE) 28 typically receives the downlink RF signal from antenna 24, down-converts the signal to baseband and digitizes the baseband signal. In an embodiment, RX FE 28 performs additional functions such as low-noise amplification, filtering and gain control.

A packet receiver 32 demodulates and decodes each received packet so as to extract the packet payload and at least some of the header fields. A 7-bit RLC UM SN counter 36 counts the received packets, and wraps around to zero every 128 packets. A 25-bit RLC HFN counter 38 is incremented on every wraparound of counter 36, so as to produce an HFN value. Counter 36 is typically initialized to zero upon connection setup. Counter 38 is typically initialized to an initial value that is negotiated between terminal 20 and the base station during a security configuration procedure.

UE 20 comprises a decryption unit 40, which decrypts the received packets. Decryption unit 40 accepts the received packets from packet receiver 32, and the current HFN value from counter 38. Unit 40 decrypts each packet using the current HFN value (in combination with other parameters) and outputs the decrypted data. As explained above, the decryption of a packet will be successful only if the HFN value used by unit 40 for decryption (the output of counter 38) matches the HFN value used by the base station for encrypting the packet.

In some embodiments, decryption unit 40 comprises multiple count generation modules 42, which generate respective COUNT-C values for use in the decryption process. The COUNT-C value and its use are defined in section 6.6.3 and 6.6.4 of the 3GPP TS 33.102 specification, cited above. Modules 42 generate the COUNT-C values from the same RLC serial number (SN), but from different HFN values. In the present example, unit comprises a total of n+1 COUNT-C generation modules that generate COUNT-C values from HFN (the output of counter 38), HFN+1, HFN+2, . . . , HFN+n, respectively.

In the present example, the COUNT-C values produced by modules 42 are provided to multiple respective decryption modules 44. When unit 40 decrypts a given packet, each decryption module 44 attempts to decrypt the given packet using a different respective COUNT-C value. In the present example, unit 40 comprises a total of n+1 decryption modules that attempt to decrypt the same packet using COUNT-C values corresponding to HFN, HFN+1, HFN+2, . . . , HFN+n, respectively. Each decryption module 44 produces a respective decrypted output. (For the sake of clarity, the description that follows refers to the decryption modules as attempting decryption using certain HFN values, meaning that they attempt decryption using the COUNT-C values derived from the HFN values.)

Each decryption attempt using a certain HFN value is referred to as a hypothesis. In other words, each decryption module 44 can be viewed as testing a different possible mismatch between the current HFN value in the base station and the current HFN value in the UE.

Consider the above-described scenario, in which UE 20 missed one or more packets from the sequence and is now attempting to receive and process a subsequent packet after reception is resumed. As long as the mismatch between the HFN value of the base station and the HFN value of the UE does not exceed n, one of decryption modules 44 will decrypt the packet correctly.

In an embodiment, a selection module 48 selects the decrypted output in which the packet is decrypted correctly (referred to as "successful decrypted output" for brevity). Module 48 typically outputs the payload data extracted from the successful decrypted output.

In addition, module 48 typically determines and outputs a corrected HFN value, which matches the HFN value of the base station. Module 48 is able to deduce the corrected HFN value from the identity of the decryption module 44 that decoded the packet successfully. For example, if the successful decrypted output was produced by the decryption module that used HFN+2 for decryption, then HFN value of the receiver should be incremented by 2 in order to match the HFN of the base station. Decryption unit 40 typically reconfigures counter 38 with the corrected HFN value, so that subsequent packets can be decrypted without HFN mismatch.

In various embodiments, selection module uses different methods to detect which decryption module 44 produces the successful decrypted output. Typically, the selection module verifies the value of a certain header field in the received packet. In one embodiment, each packet comprises a field that undergoes encryption and has a known fixed value prior to encryption. Such a field can be used as an indication of successful decryption: If the value of this field in the decrypted output matches the known fixed value, then the decryption is likely to have succeeded. If the value of the field in the decrypted output does not match the fixed value, the decryption is likely to have failed.

In an example embodiment, each packet comprises a Packet Data Convergence Protocol (PDCP) header having a field that is fixed at a value of "010". See, for example, section 8.3.1 of the 3GPP TS 25.323 specification, cited above, which defines a PDCP PDU type field that is used in this example as the fixed-value filed.

In this embodiment, selection module 48 examines the multiple decrypted outputs produced by the respective decryption modules 44, identifies the first decrypted output in which the PDCP header field is equal to "010", and regards the identified decrypted output as the successful decrypted output. In an embodiment, an expected PDCP PDU type module 43 provides the expected value ("010" in the present example) to selection unit 48.

In another example embodiment, selection module 48 identifies the successful decrypted output by examining a Circuit Switched (CS) counter value in the PDCP header, and verifying that this value is within a valid range. The valid range typically depends on the time that elapsed since the last successful decryption. Yet another example, in which the validity check is performed on an IP address field in the packet, will be described with reference to FIG. 3 below. Further alternatively, selection module 48 may use any other suitable criterion or method for identifying the successful decrypted output, using a field having a fixed value or otherwise.

By providing a sufficient number of decryption modules 44, decryption unit 40 can be designed to correct an HFN mismatch of any specified size. In other words, given sufficient processing power, decryption unit 40 can be designed to recover from any specified number of missed packets. In an example CS voice over HSPA embodiment, a set of n+1 decryption modules is able to handle a time period T in which the packets are missed, wherein T is given by T≥n·2560 mS. T may exceed n·2560 mS, for example, when the voice contains silent periods and therefore the voice encoder does not generate a packet every 20 mS. In other embodiments, other suitable time periods can be supported.

In some embodiments, decryption modules 44 operate concurrently with one another, i.e., produce the multiple decrypted outputs in parallel. In these embodiments, selection module 48 typically identifies the successful decrypted output after the various decrypted outputs have been produced.

In alternative embodiments, decryption unit 40 comprises a single decryption module 44 that is sufficiently fast to perform the n+1 decryption attempts (or other suitable number of attempts) sequentially within the allocated time frame. In these embodiments, the HFN value is incremented sequentially and decryption is reattempted, until identifying the successful decrypted output. Hybrid configurations, in which unit 40 comprises multiple decryption modules 44, each testing two or more HFN values, are also feasible.

In some embodiments, decryption unit 40 attempts to decrypt a packet using multiple different HFN values only upon detecting a mismatch in the HFN value between the transmitter and the receiver (e.g., upon failing to decrypt the packet using the current HFN value of the receiver). In other embodiments, unit 40 attempts to decrypt every packet using multiple different HFN values regardless of whether a mismatch is present or not.

The terminal configuration shown in FIG. 1 is an example configuration, which is depicted in a highly simplified manner solely for the sake of clarity. In alternative embodiments, any other suitable terminal configuration can be used. Terminal elements that are not mandatory for understanding of the disclosed techniques have been omitted from the figure for the sake of clarity and to avoid obfuscating the teaching qualities of this description. For example, uplink elements relating to transmission of uplink signals to the base station have been omitted.

In various embodiments, some or all of the elements of terminal 20 are implemented in hardware. RX FE 28, for example, may be implemented using one or more Radio Frequency Integrated Circuits (RFICs). Packet receiver 32, counter 36, counter 38 and/or decryption unit 40, for example, may be implemented using one or more Field-Programmable Gate Arrays (FPGAs) or Application-Specific Integrated Circuits (ASICs). In alternative embodiments, certain elements of terminal 20, e.g., elements of decryption unit 40, are implemented in software, or using a combination of hardware, firmware and/or software elements.

In some embodiments, certain terminal elements, such as certain elements of decryption unit 40, are implemented in a programmable processor, which is programmed in software to carry out the functions described herein. The software may be downloaded, in whole or in part, to the processor in electronic form, over a network, for example, or it may, alternatively or additionally, be provided and/or stored on non-transitory tangible media, such as magnetic, optical, or electronic memory.

Figure 2:
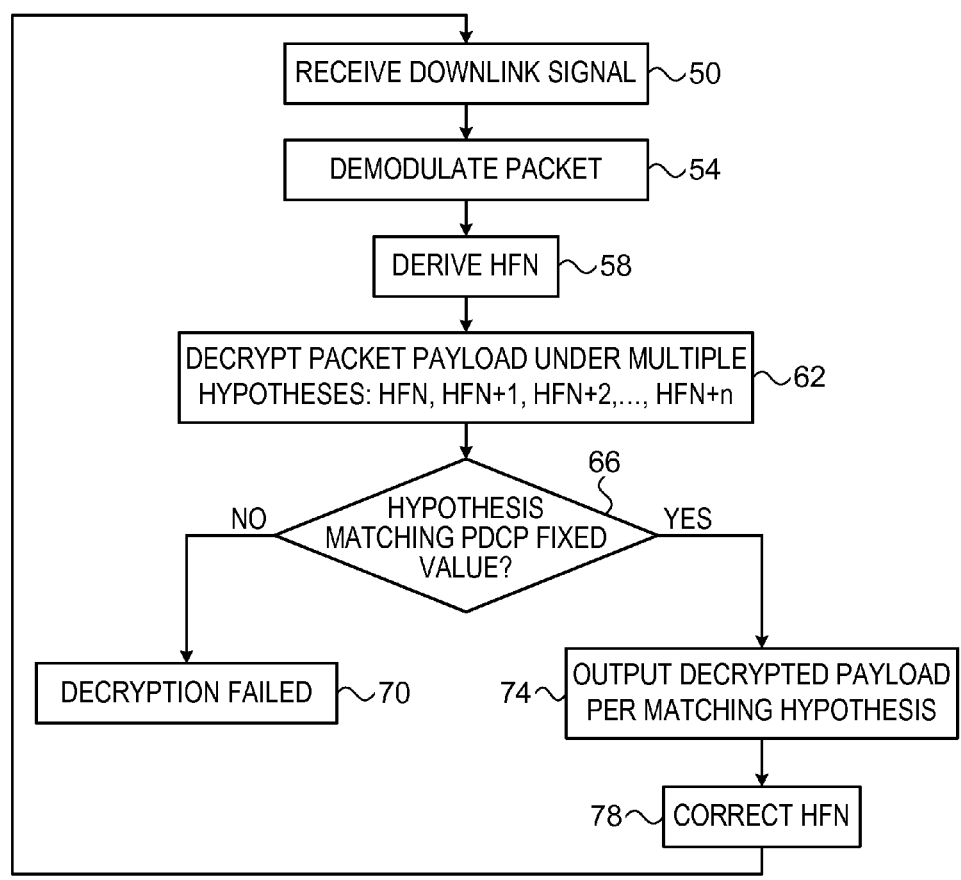
FIG. 2 is a flow chart that schematically illustrates a method for communication, in accordance with an embodiment that is described herein.

FIG. 2 is a flow chart that schematically illustrates a method for communication, in accordance with an embodiment that is described herein. The method begins with RX FE 28 of UE 20 receiving a downlink signal that carries a sequence of packets, at a signal reception operation 50. Packet receiver 32 demodulates and decodes a packet carried by the signal, at a packet reception operation 54.

Counter 38 derives the current HFN value based on reception of the packet, at an HFN derivation operation 58. Decryption unit 40 attempts to decrypt the packet under multiple hypotheses, at a decryption operation 62. As explained above, Decryption modules 44 decrypt the packet using HFN values HFN, HFN+1, . . . , HFN+n, to produce n+1 respective decrypted outputs.

Selection module 48 checks whether any of the decrypted outputs is successful in recovering the packet data, i.e., whether any of the hypotheses is correct, at a success checking operation 66. In the present embodiment, selection module 48 checks the PDCP header field having the fixed value in each decrypted output. If module 48 identifies a PDCP header field that is equal to the desired fixed value "010" (or using any other suitable validity criterion), the decrypted output having this header field is regarded as the successful decrypted output.

If no successful decrypted output is found, decryption unit 40 indicates that decryption of the packet has failed, at a failure operation 70. If a successful decrypted output is found, decryption unit 40 outputs the data of this decrypted output, at an output operation 74. Unit 40 also corrects the HFN value of the UE based on the successful decrypted output, at an HFN correction operation 78. The method then loops back to operation 50 above for receiving and processing the next packet in the sequence.

Figure 3:
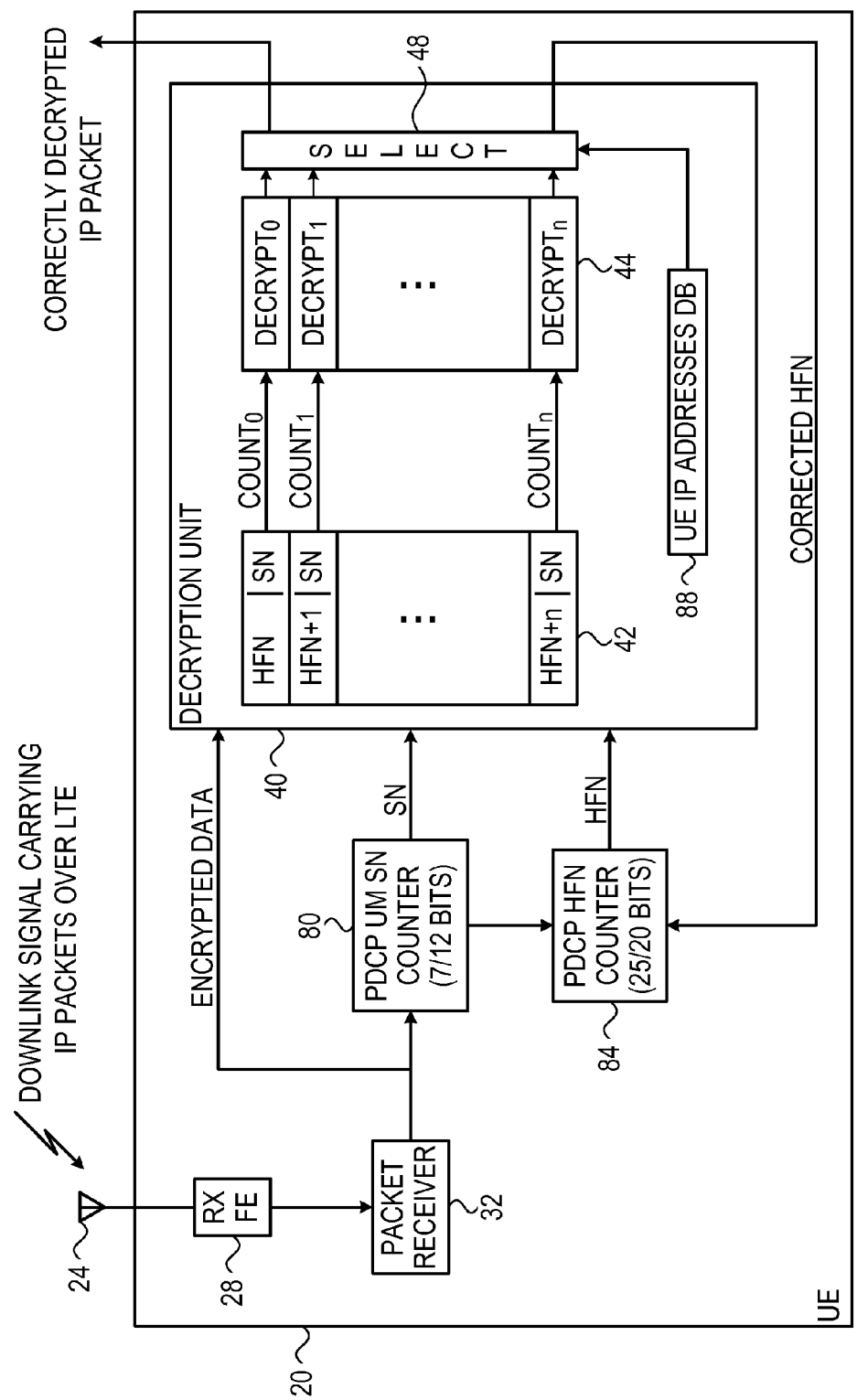
FIG. 3 is a block diagram that schematically illustrates a mobile communication terminal, in accordance with an alternative embodiment that is described herein.

FIG. 3 is a block diagram that schematically illustrates mobile communication terminal 20, in accordance with an alternative embodiment that is described herein. In the example of FIG. 3, terminal 20 comprises an LTE UE. In this example, terminal 20 receives a sequence of IP packets that are encrypted and transmitted using PDCP over UM RLC. In LTE, encryption and decryption are performed by the PDCP layer. This LTE encryption and transmission mode also uses the SN and HFN mechanism described above.

In this embodiment, a 7-bit or 12-bit PDCP UM SN counter 80 is incremented cyclically for every PDU, similarly to counter 36 of FIG. 1. A 25-bit or 20-bit PDCP HFN counter 84 is incremented cyclically on each wraparound of counter 80, similarly to counter 38 of FIG. 1. Decryption unit 40 attempts to decode each received IP packet using multiple HFN hypotheses, as explained above. The correctly-decrypted IP packet is provided as output.

In the embodiment of FIG. 3, selection module 48 uses the destination IP address of the IP packet as a validity criterion that identifies the successful decrypted output. In this example, selection module 48 queries an IP addresses database 84 of the terminal. If the destination IP address in a certain decoded output matches an entry in database 88, the decrypted output is regarded successful. Alternatively to using the destination IP address, selection module 48 may verify other suitable header field values of the IP packet.

Although the embodiments described herein mainly address recovering from packet loss in CS voice over HSPA transmission and in transmission of IP packets LTE, the methods and systems described herein can also be used in other wireless or wire-line applications that involve encryption using a counter value that is incremented independently by the transmitter and receiver.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a wireless communication terminal, receiving an Internet Protocol (IP) packet that has been encrypted with a first key;
decrypting the received IP packet multiple times using multiple respective second keys, to produce multiple respective decrypted outputs;
identifying, among the multiple decrypted outputs, a decrypted output in which a second key that was used for decrypting the IP packet matches the first key that was used for encrypting the IP packet, by identifying that a field that specifies a destination IP address in the decrypted output matches, after decryption, at least one IP address associated with the wireless communication terminal; and
recovering the data of the received IP packet from the identified decrypted output.

2. The method according to claim 1, wherein decrypting the received IP packet comprises deciphering the IP packet in a Packet Data Convergence Protocol (PDCP) layer of the terminal.

3. The method according to claim 1, wherein the received IP packet has been encrypted using an incrementing counter value, and wherein decrypting the received IP packet comprises attempting to decrypt the received IP packet multiple times using respective different counter values so as to produce the multiple respective decrypted outputs.

4. The method according to claim 3, comprising correcting the counter value in the terminal based on the counter value of the identified decrypted output.

5. The method according to claim 3, comprising recovering the counter value from the identified decrypted output, and applying the recovered counter value in decryption of a subsequent IP packet.

6. An apparatus, comprising:
a receiver front end, which is configured to receive an encrypted Internet Protocol (IP) packet that has been encrypted with a first key; and
a decryption circuit, which is configured to decrypt the received IP packet multiple times using multiple respective second keys so as to produce multiple respective decrypted outputs, to identify, among the multiple decrypted outputs, a decrypted output in which a second key that was used for decrypting the IP packet matches the first key that was used for encrypting the IP packet, by identifying that a field that specifies a destination IP address in the decrypted output matches, after decryption, at least one IP address associated with the apparatus, and to recover the data of the received IP packet from the identified decrypted output.

7. The apparatus according to claim 6, wherein the decryption circuit is configured to decrypt the received IP packet in a Packet Data Convergence Protocol (PDCP) layer.

8. The apparatus according to claim 6, wherein the received IP packet has been encrypted using an incrementing counter value, and wherein the decryption circuit is configured to attempt decrypting the received IP packet multiple times using respective different counter values so as to produce the multiple respective decrypted outputs.

9. The apparatus according to claim 8, wherein the decryption circuit is configured to correct the counter value in the apparatus based on the counter value of the identified decrypted output.

10. The apparatus according to claim 8, wherein the decryption circuit is configured to recover the counter value from the identified decrypted output, and to apply the recovered counter value in decryption of a subsequent IP packet.

11. A mobile communication terminal comprising the apparatus of claim 6.

12. A chipset for processing signals in a mobile communication terminal, comprising the apparatus of claim 6.

* * * * *